US011518235B2

(12) United States Patent
Wingate et al.

(10) Patent No.: US 11,518,235 B2
(45) Date of Patent: Dec. 6, 2022

(54) MOUNTING ARRANGEMENT FOR ENGINE EXHAUST AFTERTREATMENT SYSTEM ON CRANE CARRIER

(71) Applicant: Manitowoc Crane Companies, LLC, Manitowoc, WI (US)

(72) Inventors: Jacob Wingate, Greencastle, PA (US); Brandon L. Kline, Greencastle, PA (US); Larry S. Engle, Newville, PA (US); Cory Henry, Chambersburg, PA (US); Douglas Burkart, Chambersburg, PA (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 456 days.

(21) Appl. No.: 16/428,425

(22) Filed: May 31, 2019

(65) Prior Publication Data
US 2019/0366835 A1    Dec. 5, 2019

Related U.S. Application Data

(60) Provisional application No. 62/679,437, filed on Jun. 1, 2018.

(51) Int. Cl.
*B60K 13/04* (2006.01)
*F02M 35/04* (2006.01)
*F02M 35/16* (2006.01)

(52) U.S. Cl.
CPC ............. *B60K 13/04* (2013.01); *F02M 35/04* (2013.01); *F02M 35/164* (2013.01); *F01N 2590/08* (2013.01)

(58) Field of Classification Search
CPC .......... B60K 13/04; B66C 13/52; B62D 21/09
See application file for complete search history.

(56) References Cited

U.S. PATENT DOCUMENTS

| 6,688,481 B1 * | 2/2004 | Adner ................... B60L 50/61 |
| | | 212/195 |
| 8,394,332 B2 | 3/2013 | Koutarou |
| 8,550,198 B2 * | 10/2013 | Isaka ..................... B60K 11/08 |
| | | 180/68.1 |

(Continued)

FOREIGN PATENT DOCUMENTS

| CN | 103380252 A | 10/2013 |
| CN | 103917395 A | 7/2014 |
| CN | 104847462 A | 8/2015 |
| CN | 204712860 U | 10/2015 |

(Continued)

OTHER PUBLICATIONS

European Search Report and Written Opinion issued by EPO in connection with EP19177857 dated Oct. 10, 2019.
Office Action issued in connection with corresponding CN Pat. Appl. 201910475988 dated Feb. 18, 2022.

*Primary Examiner* — Emma K Frick
(74) *Attorney, Agent, or Firm* — Cook Alex Ltd.

(57) ABSTRACT

A crane includes a carrier having a carrier deck with a recessed section, at least a first axle and a second axle, a superstructure mounted to the carrier, an engine, and an engine exhaust aftertreatment system fluidically connected to the engine and configured to receive exhaust gas from the engine. The engine exhaust aftertreatment system is mounted in the recessed section to be positioned at least partially below an upper surface of the carrier deck between the first axle and the second axle.

8 Claims, 9 Drawing Sheets

(56) References Cited

U.S. PATENT DOCUMENTS

| | | | |
|---|---|---|---|
| 9,469,511 B2* | 10/2016 | Terata | F01N 3/035 |
| 10,071,626 B2* | 9/2018 | Kuhn | F01N 3/103 |
| 10,155,198 B2* | 12/2018 | Omori | B01D 53/9454 |
| 10,156,059 B2* | 12/2018 | Tabuchi | E02F 9/0891 |
| 10,167,610 B2* | 1/2019 | Kurosaka | F01N 3/08 |
| 10,323,557 B2* | 6/2019 | Kubota | E02F 3/325 |
| 11,046,377 B2* | 6/2021 | Boily | B62D 55/244 |
| 2008/0314033 A1 | 12/2008 | Aneja et al. | |
| 2010/0178216 A1 | 7/2010 | Honda et al. | |
| 2010/0199645 A1* | 8/2010 | Telford | F01N 13/009 |
| | | | 60/295 |
| 2012/0067661 A1 | 3/2012 | Kashu et al. | |
| 2014/0334988 A1 | 11/2014 | Stanovich et al. | |
| 2015/0204050 A1 | 7/2015 | Kanamori | |
| 2016/0326718 A1 | 11/2016 | Capraro et al. | |
| 2017/0218808 A1 | 8/2017 | Kurokawa et al. | |

FOREIGN PATENT DOCUMENTS

| | | | |
|---|---|---|---|
| CN | 105673177 A | 6/2016 | |
| CN | 106030068 A | 10/2016 | |
| CN | 205858447 U | 1/2017 | |
| CN | 106414135 A | 2/2017 | |
| CN | 107109993 A | 8/2017 | |
| DE | 102011018903 A1 | 10/2012 | |
| EP | 2474672 A1 | 7/2012 | |
| EP | 3235674 A1 | 10/2017 | |
| JP | 2008215003 A | 9/2008 | |
| JP | 4286888 B2 | 7/2009 | |
| JP | 2012149535 A | 8/2012 | |
| JP | 2018017190 A | 2/2018 | |

* cited by examiner

MOUNTING ARRANGEMENT FOR ENGINE EXHAUST AFTERTREATMENT SYSTEM ON CRANE CARRIER

BACKGROUND

The following description relates generally to a crane having an engine exhaust aftertreatment system.

A mobile crane may include an engine and an exhaust aftertreatment system to treat exhaust gas from the engine. Exhaust aftertreatment system components are typically located completely above a carrier deck or behind the carrier deck or fender planes of the mobile crane. Thus, the components of the exhaust aftertreatment system on a known crane increase an overall size of the crane. For example, when the components are located behind the carrier deck or fender plane, a length of the crane is increased beyond a length of the carrier deck. When the components are mounted above the carrier deck, the superstructure, for example, a turntable and/or a counterweight, must be designed to have sufficient clearance to rotate in a plane above the components. This increased clearance results in an increased height of the crane.

It is therefore desirable to provide a crane having an engine exhaust aftertreatment system mounted to reduce or minimize an overall envelope of the crane.

SUMMARY

According to one aspect, a crane includes a carrier having a carrier deck with a recessed section, at least a first axle and a second axle, a superstructure mounted to the carrier, an engine, and an engine exhaust aftertreatment system fluidically connected to the engine and configured to receive exhaust gas from the engine. The engine exhaust aftertreatment system is mounted in the recessed section to be positioned at least partially below an upper surface of the carrier deck between the first axle and the second axle.

The engine exhaust aftertreatment system may be secured to a mounting bracket in the recessed section. The crane may further include a power system cooling package configured to intake ambient air and direct the ambient air over the engine exhaust aftertreatment system. The crane may further include an exhaust outlet fluidically connected to the engine exhaust aftertreatment system and configured to allow egress of the exhaust gas from the engine exhaust aftertreatment system.

The superstructure may include a turntable and the recessed section may be positioned at a location over which the superstructure is configured to extend. The engine exhaust aftertreatment system may be a module having a body. The body may include a diesel oxidation catalyst section, a diesel particulate filter, a compact mixer and a selective catalyst reduction section. The body may be bisected by a midline.

According to another aspect, a crane carrier includes a carrier deck having an upper surface and a recessed section formed in the upper surface, a first axle and a second axle. The recessed section is disposed between the first axle and the second axle at a position along a length of the carrier deck.

The first axle may be a front axle and the second axle may be a rear axle. The crane carrier may further include a third axle, wherein the third axle is a front axle and the first and second axles are adjacent rear axles. A mounting bracket may be disposed in the recessed section and extend below a plane defined by the upper surface of the carrier deck. The recessed section may be positioned at an intermediate position along a length of the plane. The carrier deck may include a first platform and a second platform spaced from the first platform, and the recessed section may be formed in the first platform. The crane carrier may further include an engine exhaust aftertreatment system mounted in the recessed section.

These and other features and advantages of the present invention will be apparent from the following detailed description, in conjunction with the appended claims.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
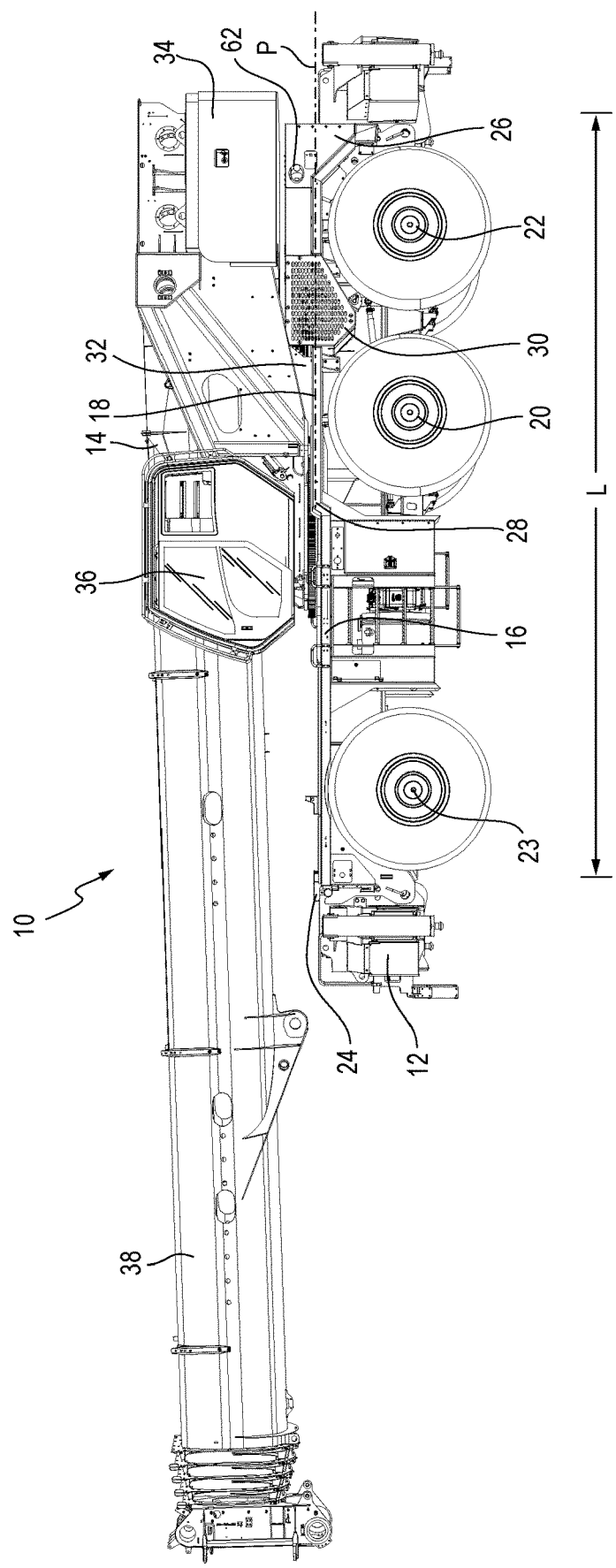
FIG. 1 is a side view of a crane having an engine exhaust aftertreatment system according to an embodiment.

FIG. 1 shows a crane 10 having a carrier 12 and a superstructure 14 rotatably mounted on the carrier 12. The carrier 12 includes a carrier deck 16 having an upper surface 18, and at least two axles 20, 22 connected to and positioned below the carrier deck 16 in a known manner. The carrier deck 16 has a first end 24 positioned generally toward a front end of the crane 10, a second end 26 positioned generally toward a rear end of the crane 10, and a length L defined between the first end 24 and the second end 26. The upper surface 18 may define an upper surface plane P along at least a portion of the length L of the carrier deck 16. In one embodiment, the carrier deck 16 may include one or more stepped portions 28 such that multiple planes are defined by the upper surface 18 along different portions of the length L.

The carrier deck 16 includes a recessed section 30 between the first end 24 and the second end 26. In one embodiment, the recessed section 30 is recessed relative to the plane P and is positioned along the portion of the length L which defines the plane P. In one embodiment, the recessed section 30 may be an opening extending through the carrier deck 16.

Figure 2:
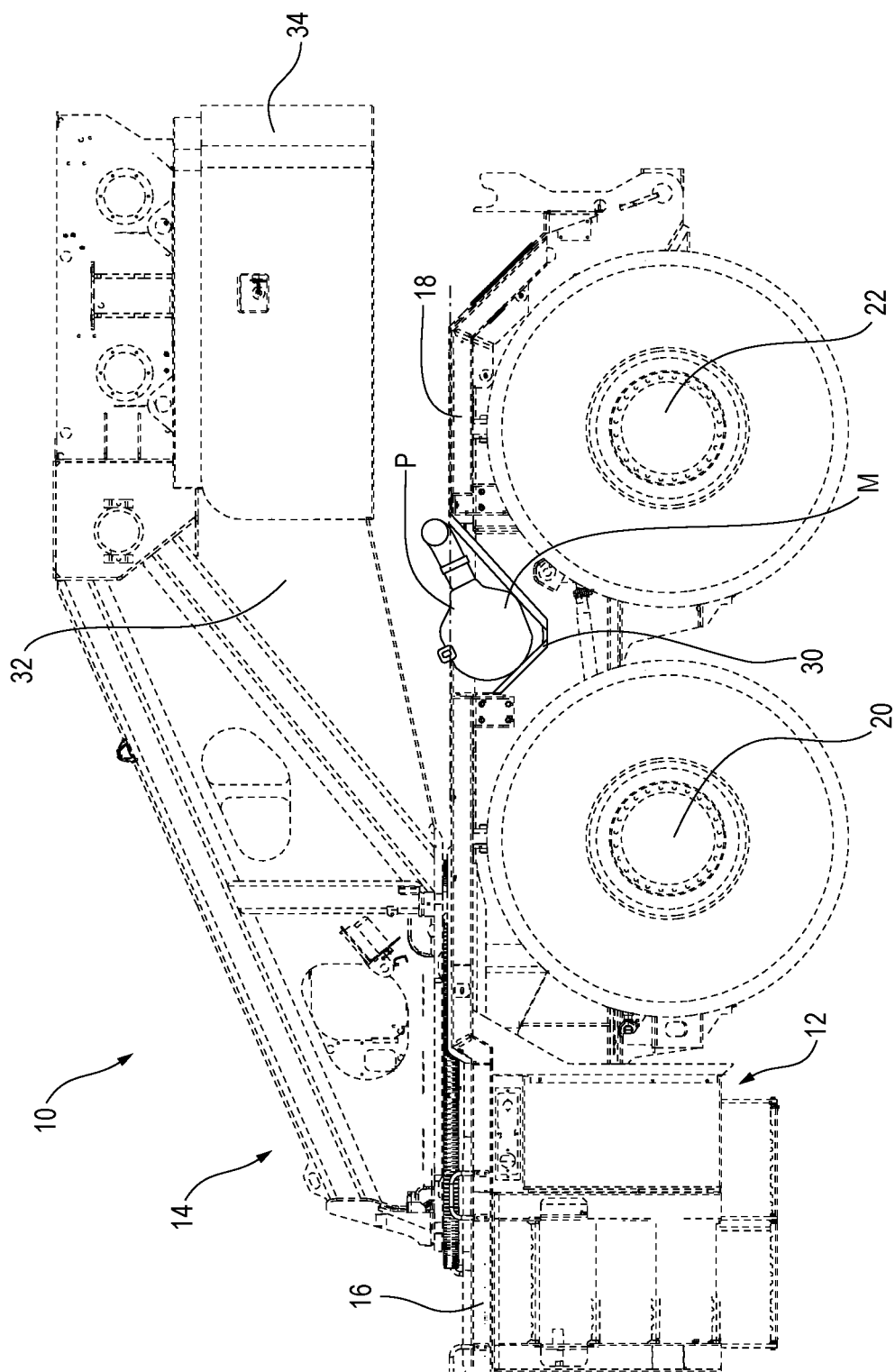
FIG. 2 is a side view showing an engine exhaust aftertreatment system mounted on a crane carrier according to an embodiment.

FIG. 2 is a side view of a portion of the crane 10 of FIG. 1. Referring to FIGS. 1 and 2, the superstructure 14 may generally include, for example, a turntable 32, a counterweight 34, an operator cab 36 and a boom 38. Other known crane components may be included on the superstructure 14 as well, such as a hoist (or hoists), one or more sensors, control systems and the like.

Figure 3:
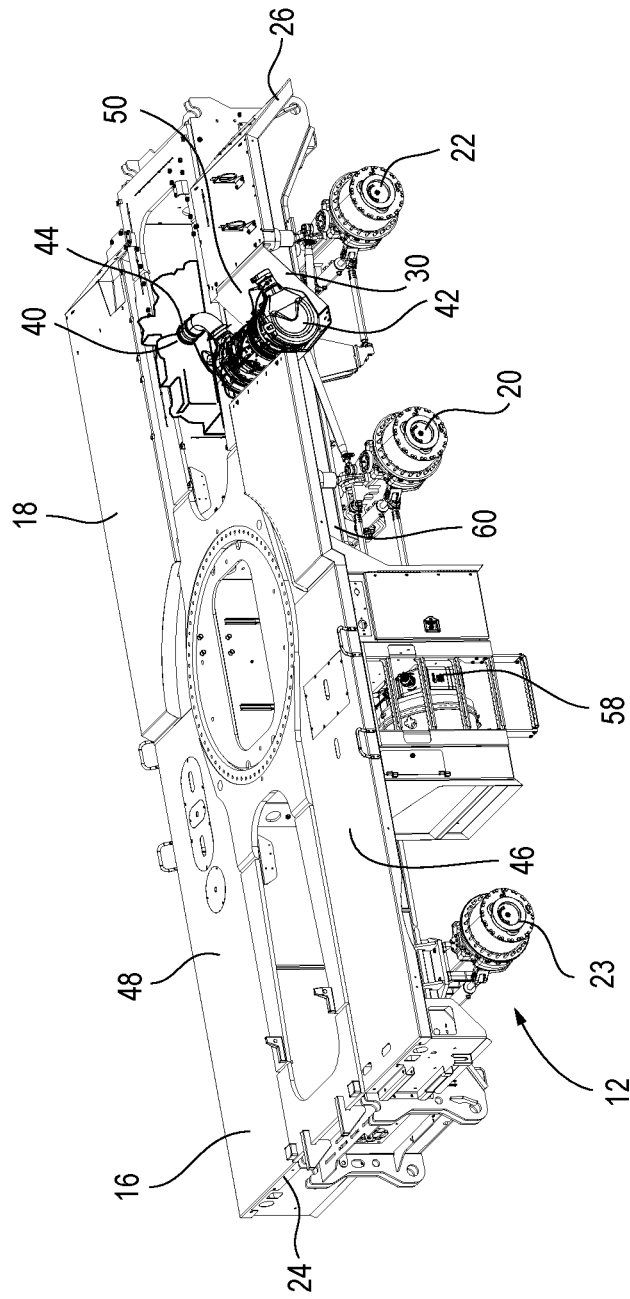
FIG. 3 is a top perspective view of a crane carrier having an engine exhaust aftertreatment system according to an embodiment.

FIG. 3 is a top perspective view of the crane carrier 12, according to an embodiment. With reference to FIGS. 1-3, an engine 40 is mounted on the crane carrier 12. In one embodiment, the engine 40 is a diesel engine.

Figure 4:
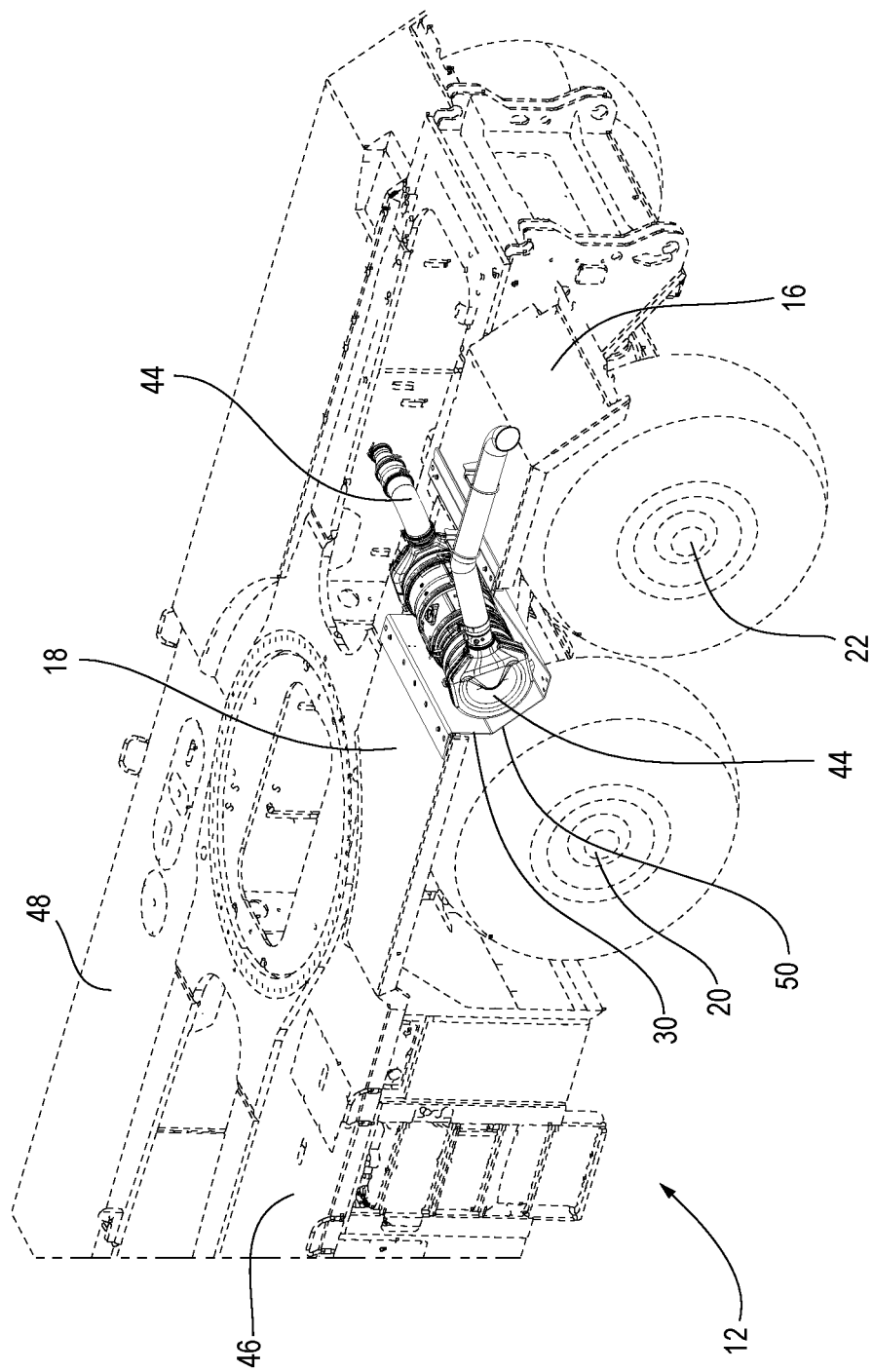
FIG. 4 is another top perspective view showing a portion of the crane carrier of FIG. 3.

FIG. 4 is a top perspective view showing a portion of the crane carrier 12 of FIG. 3. Referring to FIGS. 1-4, the crane 10 also includes an engine exhaust aftertreatment system 42 configured to receive exhaust gas from the engine 40 via a downpipe 44. The engine exhaust aftertreatment system 42 is positioned in the recessed section 30 such that it is mounted at least partially below the upper surface 18 or the plane P defined by the upper surface 18.

In one embodiment, the carrier deck 16 includes a first platform 46 and a second platform 48 spaced from the first platform 46. In one embodiment, the engine 40 may be mounted between the first platform 46 and the second platform 48. The first platform 46 may be a left side platform and the second platform 48 may be a right side platform. Each platform 46, 48 may extend a length generally corresponding to a length L of the carrier deck 16.

The engine exhaust aftertreatment system 42 may be mounted in the recessed section 30 with one or more side mounts. In one embodiment, the recessed section 30 is is formed, at least in part, by a mounting bracket 50 secured to an adjacent portion or portions of the carrier deck 16 using known, suitable fasteners. The engine exhaust aftertreatment system 42 may be mounted to the mounting bracket 50. In another embodiment, the mounting bracket 50 is integral and continuous with carrier deck 16.

Figure 5:
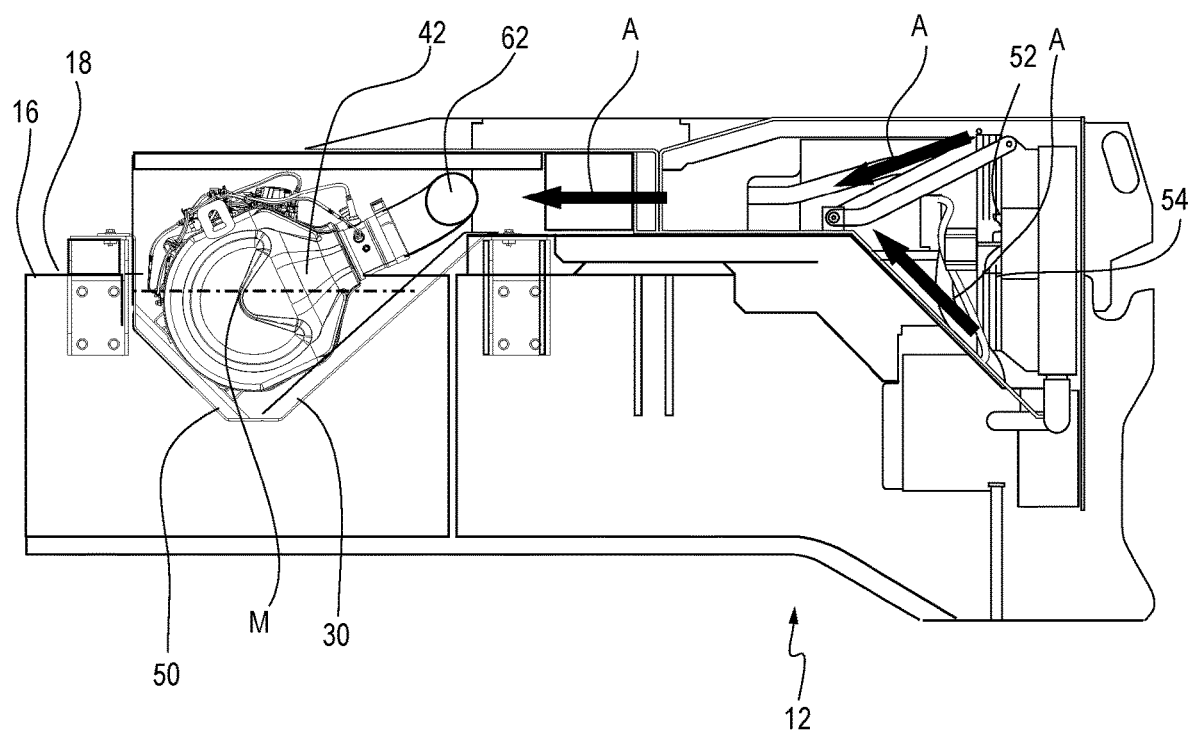
FIG. 5 is a side view showing a portion of a crane carrier having an engine exhaust aftertreatment system according to an embodiment.
Figure 6:
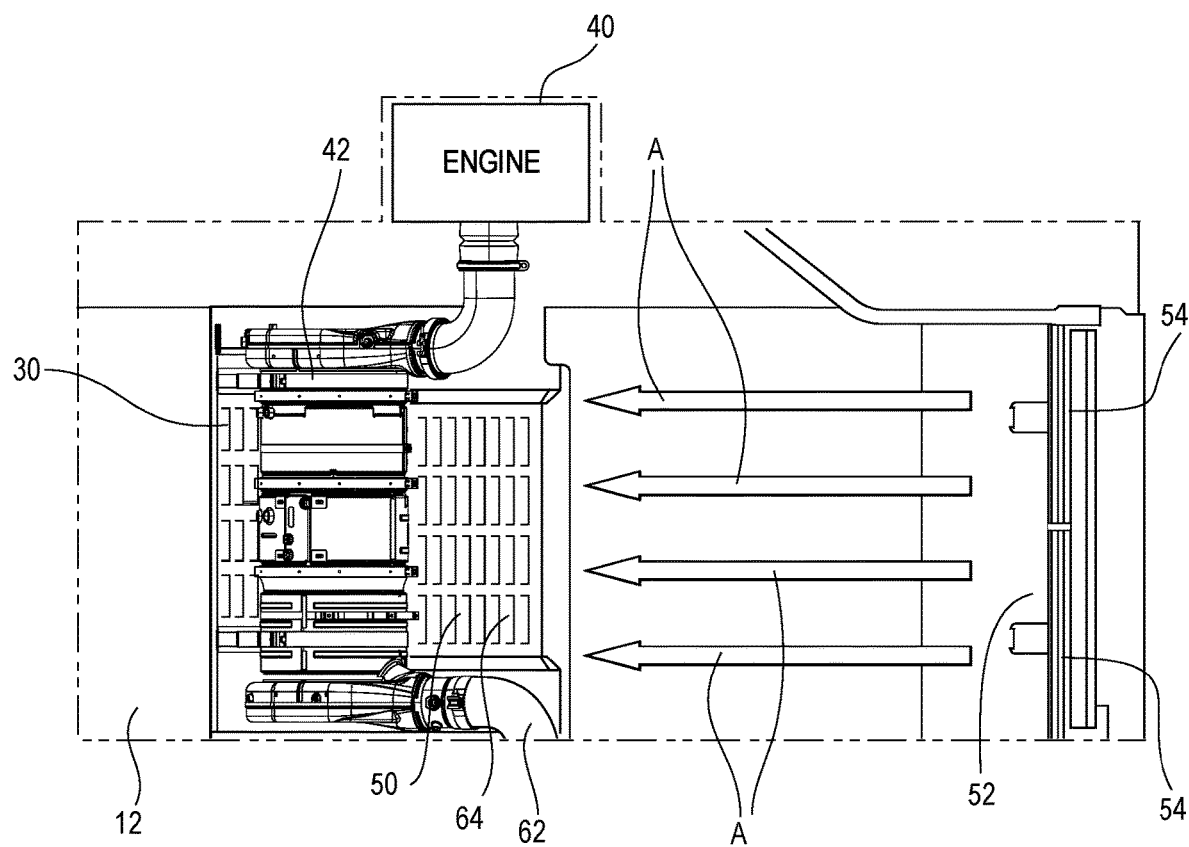
FIG. 6 is a top view of the crane carrier portion of FIG. 5.

FIG. 5 is a cut-away side view of a portion of the carrier 12 at which the engine exhaust aftertreatment system 42 is installed. FIG. 6 is a top view of the portion of the carrier 12 of FIG. 5. In one embodiment, the crane 10 may further include a power system cooling package 52 configured to intake ambient air A and direct the ambient air A over the engine exhaust aftertreatment system 42. The power system cooling package 52 may include, for example, one or more intake fans 54. In one embodiment, an ambient air flow path (shown with arrows labeled 'A' in FIGS. 5 and 6) is formed from the intake fans 54 to the engine exhaust aftertreatment system 42 such that the ambient air A taken in through the intake fans 54 may flow over the engine exhaust aftertreatment system 42 to cool the engine exhaust aftertreatment system 42.

Figure 7:
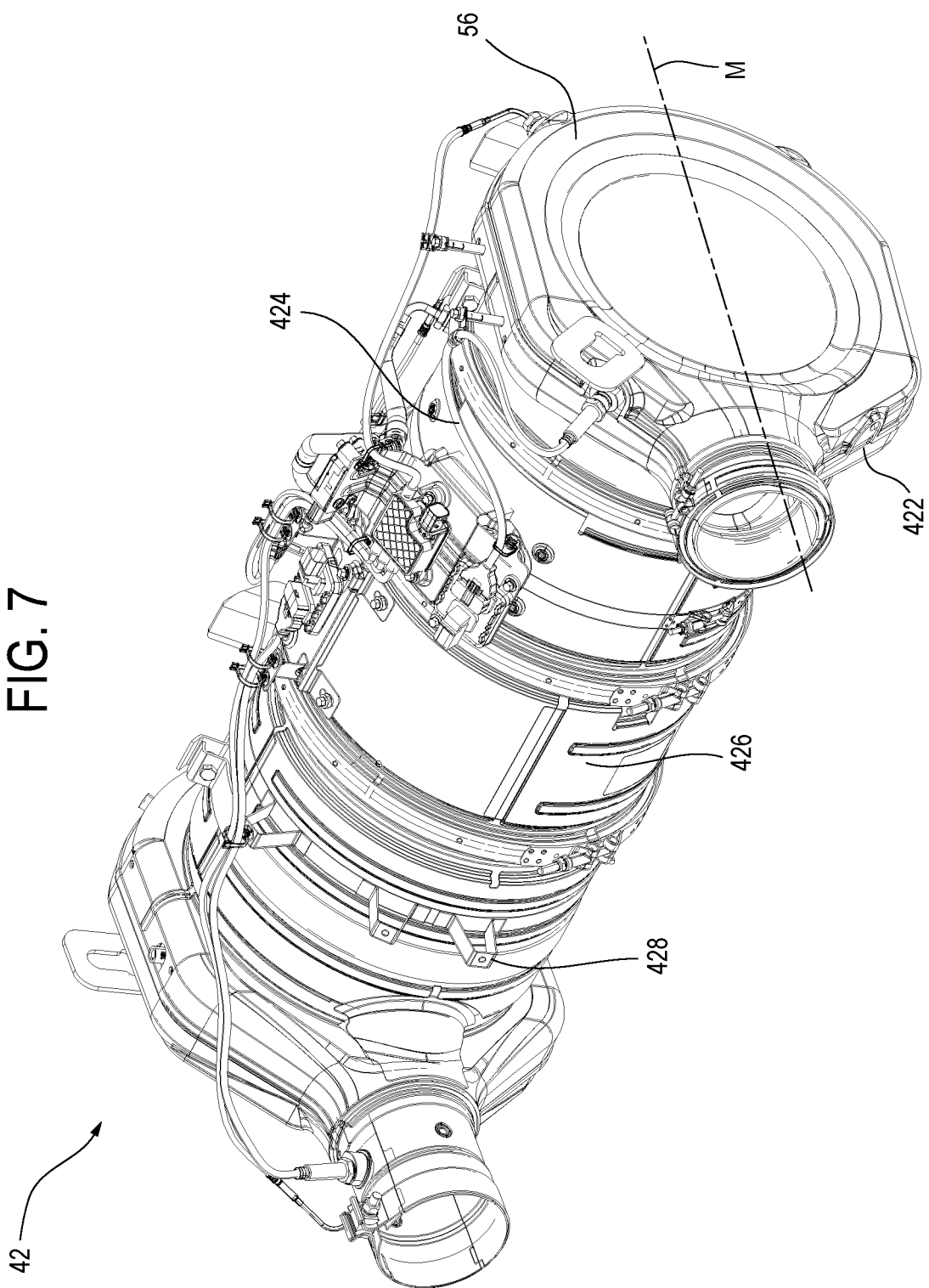
FIG. 7 is a perspective view of an engine exhaust aftertreatment system according to an embodiment.

FIG. 7 is a perspective view of the engine exhaust aftertreatment system 42, according to an embodiment. The engine exhaust aftertreatment system 42 described herein may include one or more components commonly used in known aftertreatment systems as understood by those having skill in the art. For example, the engine exhaust aftertreatment system 42 may include at least a diesel oxidation catalyst (DOC), a diesel particulate filter (DPF) and a selective catalytic reduction system (SCR). It will be appreciated by those having skill in the art that additional or fewer components may be included in the engine exhaust aftertreatment system 42 in a known manner. According to the embodiments herein, any, some or all of the components, such as the DOC, DPF and SCR, may be mounted at least partially below the upper surface 18 of the carrier deck 16.

In one embodiment, the engine exhaust aftertreatment system 30 may be a module formed as a body 56 positioned at least partially below the upper surface 18 or plane P defined by the upper surface 18. Components of the engine exhaust aftertreatment system 42 may be commonly housed or otherwise coupled to one another in the module body 56 to be mounted on the crane 10 as a unit. For example, in one embodiment, components of the module body 56 may include an inlet/diesel oxidation catalyst (DOC) section 422, a DPF section 424, a compact mixer 426 and an SCR/outlet section 428. The engine exhaust aftertreatment module body 56 may be mounted to the recessed section 30 as a unit.

It is understood, however, that the present disclosure is not limited to such a modular aftertreatment system. For example, the above-noted components of the aftertreatment system 30 may be individually and independently mounted on the carrier 12 such that any, some or all of the components are positioned at least partially below the upper surface 18 of the carrier deck 16.

Referring again to FIGS. 2, 5 and 7, for example, the engine exhaust aftertreatment system 42 may have a midline M, which substantially bisects the system 42 in a horizontal plane. For example, the midline M may substantially bisect the body 56. In different embodiments the midline M may be positioned above the plane P of the upper surface 18, substantially even or flush with the plane P of the upper surface 18, or below the plane P of the upper surface 18 (see FIG. 2, for example). In one embodiment, the recessed section 30 is positioned at an intermediate position along the length of the plane P.

The crane 10 may also include a diesel exhaust fluid (DEF) tank 58 connected to the engine exhaust aftertreatment system 42 by a supply line 60 to supply DEF to the SCR (see FIG. 3, for example).

Referring to FIGS. 5 and 6, an exhaust outlet 62 may be fluidically connected to the engine exhaust aftertreatment system 42 to allow for egress of treated exhaust from the aftertreatment system 42.

In one embodiment, the recessed section 30 is positioned at a location of the carrier 12 over which the superstructure 14 is configured to extend. For example, the recessed section 30 may be at a position on the carrier deck 12 over which a portion of the turntable 32 or counterweight 34 may rotate.

In one embodiment, the at least two axles include at least a first axle 20 and a second axle 22. In one embodiment, the first axle 20 and the second axle 22 may be any two axles of a crane. For example, the first axle 20 and the second axle 22 may be a front axle and a rear axle, respectively, of a two-axle crane. Alternatively, or in addition, the first axle 20 and the second axle 22 may be any combination of a front, rear and intermediate axle, such as an adjacent pair of axles of a crane having more than two axles. In one embodiment, the first axle 20 may be a first rear axle 20 and the second axle 22 may be a second rear axle 22 adjacent to and rearward of the first rear axle 20. In such an embodiment, the at least two axles 20, 22 may further include a third axle 23, which may be a front axle of the crane 10.

The recessed section 30 may be positioned between the first axle 20 and the second axle 22. For example, the recessed section 30 may be positioned between a front axle and a rear axle of the crane 10. In one embodiment, crane 10 may be a three-axle crane and the first axle 20 and the second axle 22 may be adjacent rear axles as described above. Thus, in such an embodiment, the recessed section 30 may be disposed between adjacent rear axles 20, 22. It is understood, however, that the present disclosure is not limited to cranes having a particular number of axles.

Figure 8:
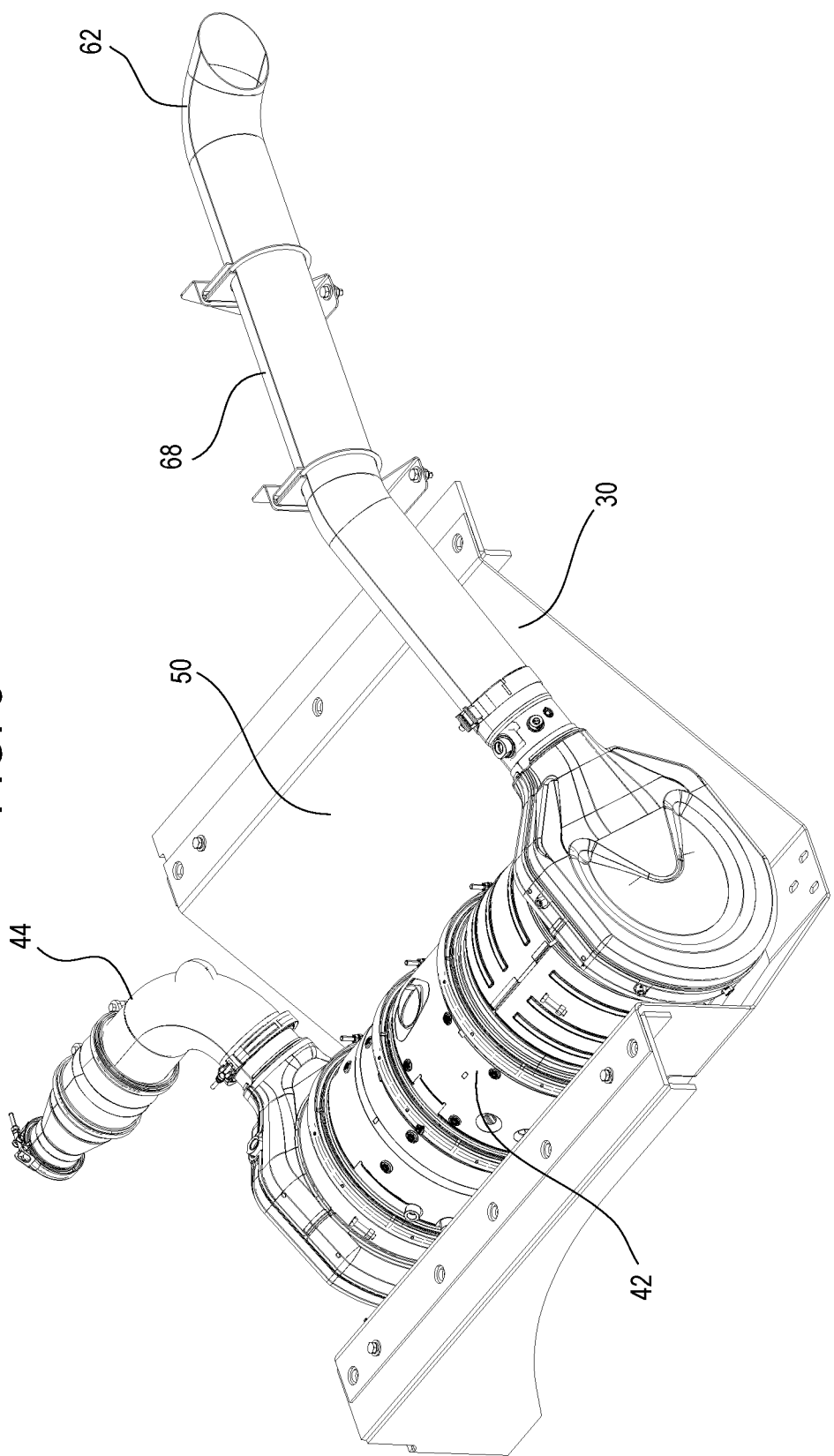
FIG. 8 is a perspective view of an engine exhaust aftertreatment and recessed section according to an embodiment.

FIG. 8 is a perspective view of the engine exhaust aftertreatment system 42 disposed in the recessed section 30. In one embodiment, the recessed section 30, for example, the mounting bracket 50, may be configured to substantially prevent ambient air from flowing therethrough, for example, by being formed without vent openings. Accordingly, ambient air A received through the power system cooling package 52 may more efficiently flow over the engine exhaust aftertreatment system 42. However, the present disclosure is not limited to such a recessed section 30. For example, in some embodiments, the recessed section 30 may include vent openings 64 (see FIG. 6).

Figure 9:
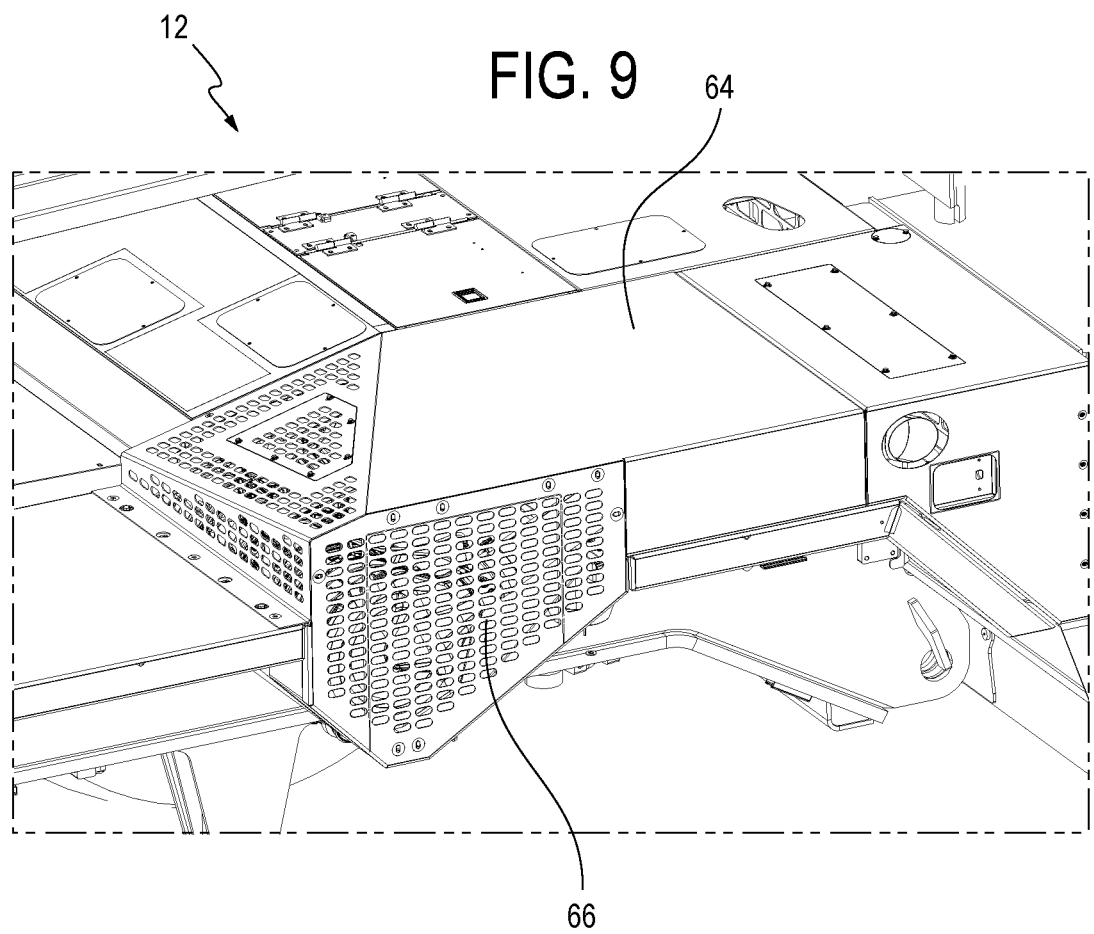
FIG. 9 is a perspective view showing a housing positioned around the engine exhaust aftertreatment system, according to an embodiment.

FIG. 9 is a perspective view a portion of the carrier 12 having the engine exhaust aftertreatment system 42 mounted in the recessed section 30. In one embodiment, a housing 64 may be secured to the carrier 12 and substantially enclose a space in which the engine exhaust aftertreatment system 42 is mounted. In one embodiment, the housing 64 may include one or more panels secured to the carrier 12. In addition, the housing 64 may include housing vent apertures 66 allowing for airflow into and out of the housing 64.

Further, in an embodiment described herein, the exhaust outlet 62 may be positioned between the first and second axles 20, 22, for example, as shown in FIG. 2. However, in other embodiments, the exhaust outlet 62 may extend to a position rearward of the second axle 22, for example, as shown in FIG. 1. In such an embodiment, the exhaust outlet 62 may include an elongated section 68, as shown in FIG. 8.

Accordingly, in the embodiments above, the engine exhaust aftertreatment system 42 is mounted at least partially below the carrier deck 16 or a plane P defined by the upper surface 18 of the carrier deck 16. In this manner, the superstructure 14, for example, the turntable 32 and/or counterweight 34, may be positioned closer to the upper surface 18 compared to a prior art crane carrier having an aftertreatment system mounted on or above the upper surface. That is, in the embodiments described herein, a lower clearance may be provided between the superstructure 14 and the carrier deck 16. In addition, by positioning the engine exhaust aftertreatment system 42 between first and second axles 20, 22, a length of the carrier 12 may substantially correspond to the length of the carrier deck 16 because rearwardly positioned attachments for aftertreatment components may be omitted.

It is understood that various features from any of the embodiments above are usable together with the other embodiments described herein.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular. In addition, it is understood that terminology referring to orientation of various components, such as "upper" or "lower" is used for the purposes of example only, and does not limit the subject matter of the present disclosure to a particular orientation.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A crane comprising:
a carrier having a carrier deck with a recessed section,
at least a first axle and a second axle;
a superstructure mounted to the carrier and configured to rotate relative to the carrier, wherein the recessed section is positioned at a location over which the superstructure is configured to extend;
an engine;
an engine exhaust aftertreatment system fluidically connected to the engine and configured to receive exhaust gas from the engine; and
a diesel exhaust fluid tank connected to the engine exhaust aftertreatment system by a supply line to supply diesel exhaust fluid to a selective catalytic reduction system of the engine exhaust aftertreatment system, and
wherein the engine exhaust aftertreatment system is mounted in the recessed section to be positioned at least partially below an upper surface of the carrier deck between the first axle and the second axle.

2. The crane of claim 1, wherein the recessed section is formed by a mounting bracket and the engine exhaust aftertreatment system is secured to the mounting bracket.

3. The crane of claim 1, further comprising a power system cooling package configured to intake ambient air and direct the ambient air over the engine exhaust aftertreatment system.

4. The crane of claim 1, further comprising an exhaust outlet fluidically connected to the engine exhaust aftertreatment system configured for egress of the exhaust gas from the engine exhaust aftertreatment system.

5. The crane of claim 1, wherein the superstructure comprises a turntable, a counterweight, an operator cab and a boom, and the recessed section is positioned at a location over which the counterweight is configured to extend.

6. The crane of claim 1, wherein the engine exhaust aftertreatment system is a module having a body.

7. The crane of claim 6, wherein the body comprises a diesel oxidation catalyst section, a diesel particulate filter, a compact mixer and a selective catalyst reduction section.

8. The crane of claim 7, wherein a midline bisects the body.

* * * * *